United States Patent
Oohira

(10) Patent No.: US 8,357,314 B2
(45) Date of Patent: Jan. 22, 2013

(54) DIELECTRIC ELASTOMER COMPOSITION AND HIGH-FREQUENCY ELECTRONIC COMPONENT MATERIAL

(75) Inventor: Kouya Oohira, Mie (JP)

(73) Assignee: NTN Corporation, Osaka (JP)

( * ) Notice: Subject to any disclaimer, the term of this patent is extended or adjusted under 35 U.S.C. 154(b) by 325 days.

(21) Appl. No.: 12/733,583

(22) PCT Filed: Sep. 25, 2008

(86) PCT No.: PCT/JP2008/067307
§ 371 (c)(1),
(2), (4) Date: Mar. 9, 2010

(87) PCT Pub. No.: WO2009/041507
PCT Pub. Date: Apr. 2, 2009

(65) Prior Publication Data
US 2010/0200816 A1    Aug. 12, 2010

(30) Foreign Application Priority Data

Sep. 28, 2007 (JP) ................................. 2007-253549
Oct. 31, 2007 (JP) ................................. 2007-283300
Feb. 11, 2008 (JP) ................................. 2008-029830
Mar. 24, 2008 (JP) ................................. 2008-076279

(51) Int. Cl.
*H01B 1/24* (2006.01)
*C04B 35/04* (2006.01)

(52) U.S. Cl. ...................................... 252/509; 501/135

(58) Field of Classification Search .................. 252/509; 501/135
See application file for complete search history.

(56) References Cited

U.S. PATENT DOCUMENTS
2007/0182640 A1    8/2007    Oohira et al.

FOREIGN PATENT DOCUMENTS

| | | | |
|---|---|---|---|
| EP | 1 767 582 A1 | * | 3/2007 |
| JP | 2005-097493 A | | 4/2005 |
| JP | 2006-001989 A | | 1/2006 |
| JP | 2006-290939 | * | 10/2006 |
| JP | 2006-290939 A | | 10/2006 |
| JP | 2007-129179 A | | 5/2007 |
| WO | WO 2008/105483 A1 | | 4/2006 |
| WO | WO 2008/105482 A1 | | 4/2008 |

OTHER PUBLICATIONS

PCT Search Report dated Dec. 16, 2008.

* cited by examiner

*Primary Examiner* — Robert D. Harlan
(74) *Attorney, Agent, or Firm* — Hedman & Costigan, P.C.; James V. Costigan

(57) ABSTRACT

It is an object of the present invention to provide a dielectric elastomer composition which has a sufficient dielectric property as a high-frequency electronic component material and to which an excellent flame retardance can be imparted as necessary in consideration of an influence on environment and the high-frequency electronic component material formed by molding the dielectric elastomer composition. The dielectric elastomer composition of the present invention comprises an elastomer to which (A) carbon black and (B) at least one powder selected from among magnesium hydroxide powder and dielectric ceramic powder is added. An average particle diameter of the carbon black is 50 to 200 nm, and 5 to 40 parts by weight thereof is added to 100 parts by weight of the elastomer. In the magnesium hydroxide powder, a content of ferric oxide is not more than 0.02 wt %. In at least one measuring condition selected from among a measuring condition (1) in which a frequency is 400 MHz and a temperature is 30° C. and a measuring condition (2) in which a frequency is 5 GHz and a temperature is 25° C., a dielectric constant is not less than three, and a dielectric dissipation factor is not more than 0.01.

14 Claims, No Drawings

DIELECTRIC ELASTOMER COMPOSITION AND HIGH-FREQUENCY ELECTRONIC COMPONENT MATERIAL

TECHNICAL FIELD

The present invention relates to a dielectric elastomer composition and a high-frequency electronic component material formed by molding the dielectric elastomer composition.

BACKGROUND ART

In recent years, with a remarkable spread of mobile phones, cordless phones, patch antennas for RFID, lens antennas such as a radio telescope, a millimeter-wave radar, and the like and significant progress of satellite communication apparatuses, a communication signal is demanded to have a high frequency, and a communication apparatus is demanded to be more compact. As the dielectric constant of a material for an antenna incorporated inside the communication apparatus becomes higher, the communication signal is allowed to have a higher frequency, and the communication apparatus is allowed to be more compact. The dielectric constant and the dielectric dissipation factor are parameters indicating the extent of a polarization inside a dielectric and the loss of an energy generated by a polarization inside the dielectric or by application of conductivity thereto respectively. Therefore the use of the material for the antenna having a high dielectric constant allows the communication signal to have a higher frequency, circuits to be shorter, and the communication apparatus to be more compact. In addition, as the use form of the communication apparatus diversifies, the material for the antenna is demanded to have a low degree of a change in its electrical characteristic at low to high temperatures, to have a low extent of dependence on a frequency in the electrical characteristic thereof, and be excellent in its flame retardance. When the material for the antenna has a low dielectric dissipation factor, power consumption at a communication time can be suppressed.

As a material for obtaining an antenna showing a high dielectric constant and a having a low dielectric dissipation factor in a wide temperature range from a low temperature to a high temperature, a dielectric elastomer composition is known. The dielectric elastomer composition contains the elastomer such as ethylene propylene rubber mixed with the barium.neodymium ceramic powder having the temperature coefficient α (unit: 1/° C.) of the dielectric constant in the range of $(-200 \text{ to } 100) \times 10^{-6}$ in the temperature of $-40°$ C. to $100°$ C. (see patent document 1).

A highly dielectric elastomer composition in which dielectric ceramics and carbon black are essentially added to an elastomer whose dielectric dissipation factor is not more than 0.007 is known. In the highly dielectric ceramics, 600 to 1400 parts by weight of the dielectric ceramics and 5 to 40 parts by weight of the carbon black are added to 100 parts by weight of the elastomer (see patent document 2).

But in the patent document 2, the kind (particle diameter and the like) of the carbon black to be added to the elastomer is not specified. Further the details of the carbon black to be added to the elastomer to obtain a material showing a high dielectric constant and a low dielectric dissipation factor is described insufficiently.

As a measure for improving the flame retardance of the material for the antenna, it is known that the material for the antenna contains a halogen flame retardant such as a brominated flame retardant or a chlorinated flame retardant, for example, polybrominated diphenyl ether (hereinafter referred to as PBDE), polybrominated biphenyl (hereinafter referred to as PBB). To improve the flame retardance, antimony trioxide is usually used in combination with the brominated flame retardant other than the PBB and the PBDE.

It is known that to improve the flame retardance of the elastomer material, in addition to the halogen flame retardant, the elastomer material contains a metal hydroxide, expanded graphite. It is known that the metal hydroxide is contained in the elastomer material composing a transfer belt and the like of an electrophotographic apparatus (see patent document 3).

The dielectric elastomer composition disclosed in the patent document 1 has a low degree of a change in its electrical characteristic from low to high temperatures and an excellent dielectric property, but does not contain the flame retardant. Therefore the dielectric elastomer composition disclosed in the patent document 1 cannot be used for applications demanded to have the flame retardance.

In using the halogen flame retardant as the flame retardant to improve the flame retardance of the dielectric elastomer composition, there is a fear that at a disposal time, dioxin is generated from the halogen flame retardant. Thus the use of the halogen flame retardant is unpreferable. The PBB and the PBDE cannot be used for electric and electronic products in accordance with the RoHS directive (directive of restricting the use of certain hazardous materials in electric and electronic apparatus) issued by the European Union (EU) and enacted in January of 2003.

Although the use of the brominated flame retardant other than the PBB and the PBDE is not prohibited, as described above, the antimony trioxide is used in combination therewith. The use of the antimony trioxide is unpreferable because the antimony trioxide contains a slight amount of lead, mercury, hexavalent chrome, and cadmium as impurities. When the material for the antenna contains the expanded graphite, the flame retardance of the material is improved, but the dielectric property thereof deteriorates extremely, which is unpreferable.

When the metal hydroxide is used, as described in the patent document 3, it is difficult to obtain the flame-retardant effect unless the elastomer material contains a large amount of the metal hydroxide. When the elastomer material contains a large amount of the metal hydroxide, normally the dielectric dissipation factor becomes high. Thus it is not known to use the metal hydroxide for the material of the antenna or the like in which a low dielectric dissipation factor is demanded. When the metal hydroxide contains a large amount of impurities such as ferric oxide, calcium oxide, silicon dioxide, and the like, the dielectric dissipation factor becomes high, which is unpreferable.

As a result of the present inventors' various investigations, they have found that when the mixing amount of the metal hydroxide is large, a foaming phenomenon occurs in a molding in dependence on a surface treatment state of the metal hydroxide. When the molding foams, there occur problems that the dielectric constant fluctuates and the adhesiveness of the molding to an electrode deteriorates.

Patent document 1: Japanese Patent Application Laid-Open No. 2006-1989

Patent document 2: Japanese Patent Application Laid-Open No. 2006-290939

Patent document 3: Japanese Patent Application Laid-Open No. 2005-97493

DISCLOSURE OF THE INVENTION

Problem to be Solved by the Invention

The present invention has been made to cope with the above-described problems. It is an object of the present invention to provide a dielectric elastomer composition which has a sufficient dielectric property as a high-frequency electronic component material and to which an excellent flame retardance can be imparted as necessary in consideration of an influence on environment and the high-frequency electronic component material formed by molding the dielectric elastomer composition.

Means for Solving the Problem

The dielectric elastomer composition of the present invention comprises an elastomer to which (A) carbon black and (B) at least one powder selected from among magnesium hydroxide powder and dielectric ceramic powder is added. An average particle diameter of the carbon black is 50 to 200 nm, and 5 to 40 parts by weight thereof is added to 100 parts by weight of the elastomer. In the magnesium hydroxide powder, a content of ferric oxide is not more than 0.02 wt %. In at least one measuring condition selected from among a measuring condition (1) in which a frequency is 400 MHz and a temperature is 30° C. and a measuring condition (2) in which a frequency is 5 GHz and a temperature is 25° C., a dielectric constant of the dielectric elastomer composition is not less than three, and a dielectric dissipation factor thereof is not more than 0.01.

5 to 25 parts by weight of the carbon black is mixed with 100 parts by weight of the elastomer; and the dielectric dissipation factor is not more than 0.006.

The dielectric elastomer composition essentially containing the magnesium hydroxide powder. 150 to 450 parts by weight of the magnesium hydroxide powder is mixed with 100 parts by weight of the elastomer.

In the magnesium hydroxide powder, a content of calcium oxide (hereinafter referred to CaO) is not more than 0.2 wt %.

In the magnesium hydroxide powder, a content of silicon dioxide (hereinafter referred to $SiO_2$) is not more than 0.2 wt %.

An average particle diameter of the magnesium hydroxide powder is not more than 10 μm.

The magnesium hydroxide powder is surface-treated.

Unsaturated fatty acid or saturated fatty acid is used to surface-treat the magnesium hydroxide powder; and in mixing the magnesium hydroxide powder surface-treated with the saturated fatty acid with the elastomer, a anti-foaming agent is mixed with the elastomer.

The unsaturated fatty acid is oleic acid. The saturated fatty acid is stearic acid.

A brominated flame retardant except PBDE and PBB is mixed with the elastomer.

The elastomer is at least one elastomer selected from among a styrene elastomer and an olefin elastomer. The elastomer is ethylene propylene rubber.

The present invention provides a high-frequency electronic component material, for handling electric signals whose frequencies are not less than 100 MHz, which is formed by using a molding of a dielectric elastomer composition.

The high-frequency electronic component material can be obtained by sticking an electrode to a surface of a molding of the dielectric elastomer composition or performing insert-molding the electrode into the molding.

EFFECT OF THE INVENTION

The dielectric elastomer composition of the present invention comprises an elastomer to which (A) carbon black and (B) at least one powder selected from among magnesium hydroxide powder and dielectric ceramic powder is added. An average particle diameter of the carbon black is 50 to 200 nm, and 5 to 40 parts by weight thereof is added to 100 parts by weight of the elastomer. In the magnesium hydroxide powder, a content of $Fe_2O_3$ is not more than 0.02 wt %. In at least one measuring condition selected from among a measuring condition (1) in which a frequency is 400 MHz and a temperature is 30° C. and a measuring condition (2) in which a frequency is 5 GHz and a temperature is 25° C., a dielectric constant of the dielectric elastomer composition is not less than three, and a dielectric dissipation factor thereof is not more than 0.01. Therefore the dielectric elastomer composition is capable of maintaining a sufficient dielectric property as the high-frequency electronic component material.

By mixing the carbon black having an average particle diameter falling in a predetermined range with the elastomer, the dielectric constant can be increased as compared with a case in which the carbon black is not mixed with the elastomer, and the dielectric dissipation factor can be prevented from exceeding 0.01. In addition, the carbon black serves as an oil-holding material of process oil which is added to the elastomer. Thus bleeding of the process oil occurs to a low extent at a kneading time, and the process oil acting effectively can be securely obtained. Therefore the kneading performance of the dielectric elastomer composition can be improved over a case in which the carbon black is not mixed with the elastomer.

In the case where the magnesium hydroxide powder is mixed with the elastomer as the above-described (B), it is possible to suppress an influence on environment and improve the flame retardance of the dielectric material. Because the magnesium hydroxide powder in which not more than 0.02 wt % of $Fe_2O_3$ is used as an impurity concentration, it is possible to decrease the dielectric dissipation factor. In addition, by using not more than 0.2 wt % of CaO, it is possible to decrease the dielectric dissipation factor. Further by using not more than 0.2 wt % of $SiO_2$, it is possible to decrease the dielectric dissipation factor. Furthermore by setting the average particle diameter of the magnesium hydroxide powder to not more than 10 μm, the dispersibility of the magnesium hydroxide contained in the dielectric elastomer composition is improved.

By surface-treating the magnesium hydroxide powder with the unsaturated fatty acid or the saturated fatty acid, the water absorption ratio of the magnesium hydroxide powder decreases, and the kneading performance of the magnesium hydroxide powder in the dielectric elastomer composition is improved. In addition, in adding the magnesium hydroxide powder surface-treated with the saturated fatty acid to the elastomer, it is possible to suppress the foaming of the molding by using the anti-foaming agent in combination with the magnesium hydroxide powder.

In the case where the dielectric ceramic powder is mixed with the elastomer as the above-described (B), it is possible to make the dielectric constant of the dielectric elastomer composition higher than a case in which the dielectric ceramic powder is not mixed with the elastomer.

By using the magnesium hydroxide powder and the brominated flame retardant in combination, although the brominated flame retardant other than the PBDE and the PBB is used, an excellent flame retardance can be securely obtained without using the antimony trioxide in combination with the brominated flame retardant, which is environmentally preferable. Compared with a case in which the flame retardant consists of the magnesium hydroxide powder, it is possible to decrease the mixing amount of the magnesium hydroxide powder and hence prevent moldability from deteriorating and the dielectric dissipation factor from becoming high.

Because the high-frequency electronic component material is formed by molding the dielectric elastomer composition, the high-frequency electronic component material so maintains the dielectric property that the dielectric constant is high and the dielectric dissipation factor is low and is excellent in its flame retardance.

BEST MODE FOR CARRYING OUT THE INVENTION

Paying attention to the fact that the dielectric dissipation factor of the dielectric elastomer composition becomes high when the dielectric elastomer composition contains a large amount of carbon black is greatly influenced by a particle diameter, the present inventors have found that the dielectric elastomer composition has sufficient dielectric constant and dielectric dissipation factor as the high-frequency electronic component material such as a material for an antenna by using a predetermined amount of the carbon black having an optimum particle diameter. They have also paid attention to the fact that as a reason the dielectric dissipation factor becomes high when magnesium hydroxide powder is used as a flame retardant, an influence of an impurity concentration is great and the fact that when a large amount of the magnesium hydroxide powder is used, a foaming phenomenon occurs in a molding. Thus they have found that when an impurity such as $Fe_2O_3$ has a concentration not more than a certain value, the magnesium hydroxide powder surface-treated is used as predetermined, and a anti-foaming agent is used in combination with the magnesium hydroxide powder as necessary, it is possible to restrain the molding from foaming, maintain the dielectric property, and impart a flame retardance to the molding. The present invention is based on the above-described finding.

As the carbon black which can be used in the present invention, it is possible to list pigments such as hard carbon and soft carbon and carbon black used to improve wear resistance. But acetylene-based carbon black having a high conductivity is unpreferable because it greatly increases the dielectric dissipation factor.

The average particle diameter of the carbon black which can be used in the present invention is favorably 50 to 200 nm and more favorably 90 to 130 nm. It is unpreferable that the average particle diameter of the carbon black is less than 50 nm, because particles of the carbon black contact the elastomer which is the base of the dielectric elastomer composition in a large area and thus the dielectric dissipation factor becomes large. In this range, the particles of the carbon black are so small that it is difficult to handle the carbon black, which is unpreferable. When the average particle diameter of the carbon black is more than 200 nm, particles of the carbon black have an unfavorable dispersibility, which is unpreferable. As commercially available products of the carbon black having the average particle diameter of 50 to 200 nm, SEAST FM, SEAST S, SEAST SP, and SEAST TA are listed.

In the present invention, the mixing ratio of the carbon black to 100 parts by weight of the elastomer is 5 to 40 parts by weight and preferably 5 to 25 parts by weight. When the mixing ratio of the carbon black is less than five parts by weight, an increase amount of the dielectric constant which is provided by the effect to be brought about by the addition of the carbon black to the elastomer is small. Further in this case, because the carbon black has an oil-holding effect to a low extent, process oil bleeds to the surface of a molding, with the result that the adhesiveness of the dielectric elastomer composition to an electrode deteriorates and the dielectric property greatly changes, which is unpreferable. On the other hand, when the mixing ratio of the carbon black to 100 parts by weight of the elastomer is more than 40 parts by weight, the dielectric dissipation factor becomes large, which is unpreferable.

To impart flame retardance to the dielectric elastomer composition without adversely influencing environment in addition to the improvement of the dielectric constant, it is preferable that the magnesium hydroxide powder is mixed with the elastomer as a metal hydroxide. The magnesium hydroxide makes endothermic dehydration reaction under high heat, thus absorbing heat and discharging water molecules. Thereby the magnesium hydroxide lowers temperature and is capable of imparting flame retardance to the dielectric elastomer composition. The decomposition temperature of the magnesium hydroxide is 300 to 350° C. In addition to the magnesium hydroxide powder, other metal hydroxides such as aluminum hydroxide, dawsonite, calcium aluminate oxide, calcium hydroxide, barium hydroxide, hydrotalcite, and the like may be mixed with the elastomer.

It is essential that in the magnesium hydroxide powder to be used in the present invention, as an impurity concentration, the content of $Fe_2O_3$ is not more than 0.02 wt %. When the content of the $Fe_2O_3$ exceeds 0.02 wt %, the dielectric dissipation factor becomes high, which is unpreferable. It is preferable that as the impurity concentration, the content of CaO is not more than 0.2 wt %. When the content of the CaO exceeds 0.2 wt %, the dielectric dissipation factor becomes high, which is unpreferable. It is preferable that as the impurity concentration, the content of $SiO_2$ is not more than 0.2 wt %. When the content of the $SiO_2$ exceeds 0.2 wt %, the dielectric dissipation factor becomes high, which is unpreferable.

It is preferable that a BET specific surface area of the magnesium hydroxide powder is in the range of 1 to 20 $m^2/g$ and that the average particle diameter thereof is in the range of 0.1 to 50 μm. To improve the dispersibility of the magnesium hydroxide powder in the dielectric elastomer composition, the average particle diameter thereof is preferably not more than 10 μm.

To improve dispersibility and processability, it is preferable to surface-treat the magnesium hydroxide powder with a silane coupling agent, a titanate-based coupling agent, an epoxy-based surface-treating agent, higher fatty acids or salts thereof, higher alcohols or a surface-active agent.

In the present invention, as methods of surface-treating the magnesium hydroxide powder by using the silane coupling agent, a dry method and a wet slurry method can be adopted. Other than the above-described surface treatment which is performed in advance, it is possible to surface-treat the magnesium hydroxide powder by adding the silane coupling agent to the dielectric elastomer composition with the with silane coupling agent being mixed with the magnesium hydroxide powder and other components.

In surface-treating the magnesium hydroxide powder with the higher fatty acid or the salts thereof, it is possible to adopt a method of melting the higher fatty acid or the salts thereof and spraying them and surface-treating the magnesium hydroxide powder with a Henschel mixer by using the dry method.

The higher fatty acid is classified as either unsaturated fatty acid or saturated fatty acid. In adding the magnesium hydroxide powder surface-treated with the saturated fatty acid to the elastomer, it is essential to use an anti-foaming agent in combination with the magnesium hydroxide powder. In using the magnesium hydroxide powder surface-treated with the unsaturated fatty acid, it is considered that the use of the anti-foaming agent in combination with the magnesium hydroxide powder is unnecessary because decomposed substances generated by heating and water when the dielectric elastomer composition is molded attach to the double bonds of the unsaturated fatty acid.

As the unsaturated fatty acid that can be used in the present invention, oleic acid, palmitoleic acid, vaccenic acid, and linoleic acid are listed. In view of the balance between cost and performance, it is preferable to use the oleic acid. These unsaturated fatty acids can be used singly or in combination of not less than two kinds thereof.

As the saturated fatty acid that can be used in the present invention, lauric acid, myristic acid, pentadecyl acid, palmitic acid, margaric acid, stearic acid, and arachidic acid are listed. In view of the balance between cost and performance, it is preferable to use the stearic acid. These saturated fatty acids can be used singly or in combination of not less than two kinds thereof.

In the present invention, in adding the magnesium hydroxide powder surface-treated with the saturated fatty acid to the elastomer, the anti-foaming agent absorbs or disperses gases such as carbon dioxide and vapor generated by heating when the elastomer composition is molded, thereby playing the role of uniformly dispersing the magnesium hydroxide powder in the elastomer composition.

As commercially available products of the anti-foaming agent, "VESTA series" (PP, 18, 20, BS, C80EX) produced by Inoue Kogyo Co., Ltd., "CML series" (#21, #31, #35) produced by Ohmi Chemical Industry Co., Ltd. are listed. Of these anti-foaming agents, in consideration of kneading performance, it is especially preferable to use "VESTA C80EX".

As commercially available products of the magnesium hydroxide powder that can be used in the present invention, "N-6" (average particle diameter: 1.3 μm, surface-treated, saturated fatty acid, impurity concentration: $Fe_2O_3$: 0.001 to 0.003 wt %, $SiO_2$: 0.03 to 0.05 wt %, CaO: 0.1 to 0.15 wt %) produced by Kamishima Chemical Co., Ltd.; "Kisuma5A" (average particle diameter: 0.85 μm, surface-treated, saturated fatty acid, impurity concentration: $Fe_2O_3$: 0.0001 to 0.001 wt %, $SiO_2$: 0.01 to 0.05 wt %, CaO: 0.01 to 0.15 wt %) and "5B" (average particle diameter: 0.87 μm, surface-treated, unsaturated fatty acid, impurity concentration: $Fe_2O_3$: 0.0001 to 0.001 wt %, $SiO_2$: 0.01 to 0.05 wt %, CaO: 0.01 to 0.15 wt %) produced by Kyowa Chemical Industry Co., Ltd.; "MGZ-1" (average particle diameter: 0.8 μm, surface-treated, unsaturated fatty acid, impurity concentration: $Fe_2O_3$: 0.0005 to 0.02 wt %, $SiO_2$: 0.01 to 0.2 wt %, CaO: 0.01 to 0.15 wt %) produced by Sakai Chemical Industry Co., Ltd. and "MGZ-3" (average particle diameter: 0.1 μm, surface-treated, unsaturated fatty acid, impurity concentration: $Fe_2O_3$: 0.0005 to 0.02 wt %, $SiO_2$: 0.01 to 0.2 wt %, CaO: 0.01 to 0.15 wt %) produced by Sakai Chemical Industry Co., Ltd. are listed.

Regarding the mixing ratio of the magnesium hydroxide powder in the dielectric elastomer composition of the present invention, 100 to 600 parts by weight is favorable to 100 parts by weight of the dielectric elastomer composition and more favorably 150 to 450 parts by weight. At less than 100 parts by weight, a sufficient flame retardance (more specifically, test described in examples described later) cannot be obtained. On the other hand, at more than 600 parts by weight, the dielectric dissipation factor may exceed 0.01 in dependence on a temperature, and kneading performance deteriorates extremely. Thus the dielectric property demanded as the high-frequency electronic component material cannot be satisfied.

In consideration of a load to be applied to environment and impartation of the flame retardance to the dielectric elastomer composition, in addition to the magnesium hydroxide powder, a minimum necessary amount of a brominated flame retardant or the like having a high flame retardant effect may be mixed with the elastomer. As the brominated flame retardant, it is possible to use any brominated flame retardant other than PBDE and PBB. For example, ethylenebispentabromobenzene, decabromodiphenyl ether, TBA-bis(2,3-dibromopropyl ether), bis(3,5-dibromo-4-dibromopropyloxyphenyl)sulfone, triallylisocyanate hexabromide, hexabromocyclododecan, octabromodiphenyl ether, tetrabromobisphenol A, ethylenebistetrabromophthalimide, and brominated polystyrene are listed.

Of these brominated flame retardants, the ethylenebispentabromobenzene and the decabromodiphenyl ether are preferable because these brominated flame retardants have a melting point not less than 300° C. and a bromination ratio not less than 80%. As commercially available products of the ethylenebispentabromobenzene and the decabromodiphenyl ether, "FCP801" produced by Suzuhiro Chemical Co., Ltd. and "FCP83D" produced by Suzuhiro Chemical Co., Ltd. are exemplified respectively.

As elastomers composing the dielectric elastomer composition of the present invention, it is possible to use natural rubber-based elastomers and synthetic rubber-based elastomers. As the elastomer to be used in the present invention, an elastomer having a specific gravity of 0.8 to 1.1 at 25° C. is preferable. When the specific gravity is less than 0.8, the elastomer has a low strength because of a low molecular weight and a molding has a large number of pores, which is unpreferable. When the specific gravity exceeds 1.1, products are heavy, which is unpreferable.

As the natural rubber-based elastomer, it is possible to list natural rubber, chlorinated rubber, rubber hydrochloride, cyclized rubber, maleate rubber, hydrogenated rubber, graft-modified rubber by grafting a vinyl monomer such as methyl methacrylate, acrylonitrile, methacrylate ester with double bonds of the natural rubber, and a block polymer formed by refining the natural rubber in a nitrogen gas flow in the presence of a monomer. In addition to the elastomers whose material is the natural rubber, it is possible to list elastomers whose material is synthetic cis-1,4-polyisoprene.

As the synthetic rubber elastomer, it is possible to list a polyolefin elastomer such as isobutylene rubber, ethylene propylene rubber, ethylene-propylene-diene rubber, ethylene-propylene terpolymer, chlorosulfonated polyethylene rubber; a styrene elastomer such as a styrene-isoprene-styrene block copolymer, (SIS), a styrene-butadiene-styrene copolymer (SBS), a styrene-ethylene-butylene-styrene block copolymer (SEBS); isoprene rubber; urethane rubber; epichlorohydrin rubber; silicone rubber; nylon 12; butyl rubber; butadiene rubber; polynorbornene rubber, and acrylonitrile-butadiene rubber.

These elastomers can be used singly or by mixing not less than two kinds thereof with each other. In the range in which the elastic force of the elastomer is not damaged, it is possible to use one kind of thermoplastic resin or by mixing not less than two kinds thereof with each other. In the present invention, of the above-described elastomers, because of excellent electrical property, it is preferable to use at least one elastomer selected from among the styrene elastomer and the olefin elastomer. Because the ethylene propylene rubber and the ethylene-propylene-diene rubber have a very low dielectric dissipation factor, these rubbers can be preferably used as the high-frequency electronic component material such as a material for an antenna.

To improve the dielectric constant of the dielectric elastomer composition, it is preferable that the dielectric elastomer composition of the present invention contains dielectric ceramic powder. It is preferable that the dielectric ceramic powder which can be used in the present invention is at least one substance selected from among oxides of groups IIa, IVa, IIIb, and IVb; carbonates, phosphates, silicates; and composite oxides containing the groups IIa, IVa, IIIb, and IVb. More specifically, $TiO_2$, $CaTiO_3$, $MgTiO_3$, $Al_2O_3$, $BaTiO_3$, $SrTiO_3$, $Ca_2P_2O_7$, $SiO_2$, $Mg_2SiO_4$, $Ca_2MgSi_2O_7$ are listed. To improve the temperature-dependent property of the dielectric constant, $BaO$—$TiO_2$—$Nd_2O_3$-based ceramics containing alkali earth metals and oxides of rare earth elements are listed. To improve the property, a trace element composition such as Al, Zr or the like may be contained in the dielectric elastomer composition.

The average particle diameter of the dielectric ceramic powder is preferably 0.01 to 100 μm. It is unpreferable that the average particle diameter of the dielectric ceramic powder is less than 0.01 μm, because it is difficult to handle particles. It is unpreferable that the average particle diameter of the dielectric ceramic powder is more than 100 μm, because there is a fear that variation of the dielectric property is caused in the molding. More practical range is 0.1 to 20 μm.

Regarding the mixing ratio of the dielectric ceramic powder in the dielectric elastomer composition of the present invention, 50 to 1000 parts by weight for 100 parts by weight of the elastomer is favorable. By adding the dielectric ceramic powder to the elastomer in the above-described range, it is possible to improve the dielectric constant by 1 to 20 over a case where the dielectric ceramic powder is not added thereto.

In the dielectric elastomer composition of the present invention, in the range in which the effect of the present invention is not damaged, the following agents can be added thereto: (1) to improve the affinity of the interface between the elastomer and the dielectric ceramic powder and the adhesiveness of the ceramic powder to the elastomer to thereby improve the mechanical strength, a coupling agent such as the silane coupling agent, the titanate coupling agent, a zirconia aluminate coupling agent or the like, (2) to improve the plating property for forming an electrode, a filler such as talc, calcium pyrophosphate or the like consisting of fine particle, (3) to improve the heat stability to a high extent, an antioxidant, (4) to improve the light resistance, a light stabilizer such as an ultraviolet-absorbing agent, (5) to improve the shock resistance, an impact-resistant agent, (6) for coloring, a coloring agent such as dye, pigment or the like, (7) to adjust the property, a plasticizer, a crosslinking agent such as sulfur, peroxides, and (8) to accelerate vulcanization, a vulcanization accelerator.

In the range in which the object of the present invention is not damaged, the dielectric elastomer composition of the present invention can be used in combination with alkali metal titanate fiber such as glass fiber, potassium titanate whisker; boric acid-metal salt fiber such as titanium oxide fiber, magnesium borate whisker, aluminum borate whisker; silicic acid-metal salt fiber such as zinc silicate whisker, magnesium silicate whisker; and various organic or inorganic fillers such as carbon fiber, alumina fiber, and aramid fiber.

The method of producing the dielectric elastomer composition of the present invention is not limited to a specific method, but various mixing and molding methods can be used. It is possible to exemplify a method of mixing the carbon black, the magnesium hydroxide powder, the dielectric ceramic powder, various additives, a vulcanized agent and the like with the elastomer and kneading the components with a Banbury mixer, a roller, a biaxial extruder or the like.

By molding the obtained dielectric elastomer composition by injection molding, extrusion molding or heated compression molding, it is possible to obtain the molding of the dielectric elastomer composition.

The dielectric elastomer composition of the present invention is at least one measuring condition selected from among a measuring condition (1) in which a frequency is 400 MHz and a temperature is 30° C. and a measuring condition (2) in which a frequency is 5 GHz and a temperature is 25° C., a dielectric constant of the above-described dielectric elastomer composition is not less than three, and a dielectric dissipation factor there of is not more than 0.01 (preferably not more than 0.006). In the case where the above-described properties are satisfied in the above-described (1) and (2), the degree of the dependence of the electrical characteristic on a frequency is low, which is preferable. The dielectric ceramic powder other than the carbon black and the magnesium hydroxide powder is mixed with the elastomer at a rate at which the above-described properties are satisfied.

The high-frequency electronic component material of the present invention can be easily obtained by sticking an electrode to the surface of a molding of the dielectric elastomer composition, sticking the dielectric elastomer composition to both surfaces of the electrode or performing insert-molding the electrode into the molding of the dielectric elastomer composition.

As a bonding means to be used in the sticking processing, it is possible to utilize bonding films such as TFA-880CC, TFA-890EA produced by KYOCERA Chemical Corporation, E56 produced by Shin-Etsu Chemical Co., Ltd., SAFV, SAFD, SAFW produced by NIKKAN INDUSTRIES Co., Ltd. As other means, it is possible to stick the electrode and the molding of the dielectric elastomer composition to each other by applying an adhesive agent thereto. Regarding the insert molding, it is possible to mold the dielectric elastomer composition by filling the dielectric elastomer composition in a molding die in which the electrode is mounted at a predetermined position.

EXAMPLES

Examples 1 through 11 and Comparative Examples 1 through 4

Ethylene propylene rubber ("EP35" produced by JSR Corporation), dielectric ceramic powder ("HF-120" or "STNAS" produced by KCM Corporation Co., Ltd.), carbon black (five kinds of "SEAST series" produced by Tokai Carbon Co., Ltd.), magnesium hydroxide ("MGZ-1" produced by Sakai Chemical Co., Ltd.), a brominated flame retardant ("FCP801" produced by Suzuhiro Chemical Co., Ltd.), and process oil ("PW380" produced by Idemitsu Kosan Co., Ltd.), zinc oxide ("META-Z L40" produced by Inoue Calcium Corporation), stearic acid ("LUNAC S-30" produced by Kao Corporation) were mixed with one another at the mixing ratio shown in table 1. In addition, an age resistor ("NONFLEX RD" produced by Seiko Chemical Co., Ltd.), a vulcanization accelerator ("Soxinol" produced by Sumitomo Chemical Co., Ltd.), and a peroxide crosslinking agent ("Hi-Cross M" produced by Seiko Chemical Co., Ltd.) were added to the mixed components. After the components were kneaded by a press kneader, a molding of each of the examples and the comparative examples having a dimension of 80 mm×80 mm×1.5 mm was obtained by carrying out heated compression molding. The vulcanization condition for each specimen was 170° C.×20 minutes. The particle diameter shown in table 1 is the average particle diameter.

The dielectric constant and dielectric dissipation factor were measured on the molding of the dielectric elastomer composition obtained in each of the examples and the comparative examples by a method described below. Table 1 shows the results.

<Measurement of Dielectric Constant and Dielectric Dissipation Factor>

The dielectric constant and dielectric dissipation factor of each of the obtained moldings were measured by a capacitance method in a frequency band of 400 MHz by setting the temperature to 30° C. A measuring apparatus used in the capacitance method was an impedance analyzer: E4991A (produced by Agilent Technologies Inc.). An electrode used was 16453A (produced by Agilent Technologies Inc.).

<Test for Examining Flame Retardance>

The obtained moldings underwent a UL94HB combustion test conforming to ASTM D635 or a UL94V combustion test conforming to ASTM D3801. Regarding the flame retardance of each molding, flame retardance grades specified in each test method were obtained.

TABLE 1

| Mixing ratio of each component (part by weight) | Kind | particle diameter (nm) | Example 1 | 2 | 3 | 4 | 5 | 6 |
|---|---|---|---|---|---|---|---|---|
| Ethylene propylene rubber | EP35 | — | 100 | 100 | 100 | 100 | 100 | 100 |
| Ceramic powder | HF120 | — | 450 | 450 | 450 | 450 | 450 | 450 |
|  | STNAS | — | — | — | — | — | — | — |
| Carbon black | SEAST FM | 50 | — | — | — | 25 | — | — |
|  | SEAST S | 66 | 5 | 25 | 40 | — | — | — |
|  | SEAST SP | 95 | — | — | — | — | 25 | — |
|  | SEAST TA | 122 | — | — | — | — | — | 25 |
|  | SEAST SO | 43 | — | — | — | — | — | — |
| Powder of $Mg(OH)_2$ | MGZ-1 | — | — | — | — | — | — | — |
| Flame retardant | FCP801 | — | — | — | — | — | — | — |
| Process oil | PW-380 | — | 30 | 30 | 30 | 30 | 30 | 30 |
| Zinc oxide | META-Z L40 | — | 5 | 5 | 5 | 5 | 5 | 5 |
| Stearic acid | LUNAC S-30 | — | 1 | 1 | 1 | 1 | 1 | 1 |
| Age resistor | NONFLEX RD | — | 3 | 3 | 3 | 3 | 3 | 3 |
| Vulcanization accelerator | Soxinol M | — | 5 | 5 | 5 | 5 | 5 | 5 |
| Peroxide crosslinking agent | Hi-Cross M | — | 10 | 10 | 10 | 10 | 10 | 10 |
| Dielectric constant (400 MHz) |  |  | 8 | 9.5 | 10.5 | 10.1 | 8.8 | 7.4 |
| Dielectric dissipation factor (400 MHz) |  |  | 0.0031 | 0.0044 | 0.0091 | 0.0055 | 0.0039 | 0.0029 |
| Flame retardance |  |  | — | — | — | — | — | — |

| Mixing ratio of each component (part by weight) | Kind | particle diameter (nm) | Example 7 | 8 | 9 | 10 | 11 |
|---|---|---|---|---|---|---|---|
| Ethylene propylene rubber | EP35 | — | 100 | 100 | 100 | 100 | 100 |
| Ceramic powder | HF120 | — | — | — | — | — | — |
|  | STNAS | — | 330 | 330 | — | 50 | 600 |
| Carbon black | SEAST FM | 50 | — | — | — | — | — |
|  | SEAST S | 66 | 25 | 25 | 25 | 25 | 25 |
|  | SEAST SP | 95 | — | — | — | — | — |
|  | SEAST TA | 122 | — | — | — | — | — |
|  | SEAST SO | 43 | — | — | — | — | — |
| Powder of $Mg(OH)_2$ | MGZ-1 | — | 150 | 150 | 300 | 150 | 150 |
| Flame retardant | FCP801 | — | — | 50 | 50 | 50 | 50 |
| Process oil | PW-380 | — | 30 | 30 | 30 | 30 | 30 |
| Zinc oxide | META-Z L40 | — | 5 | 5 | 5 | 5 | 5 |
| Stearic acid | LUNAC S-30 | — | 1 | 1 | 1 | 1 | 1 |
| Age resistor | NONFLEX RD | — | 3 | 3 | 3 | 3 | 3 |
| Vulcanization accelerator | Soxinol M | — | 5 | 5 | 5 | 5 | 5 |
| Peroxide crosslinking agent | Hi-Cross M | — | 10 | 10 | 10 | 10 | 10 |
| Dielectric constant (400 MHz) |  |  | 9.6 | 9.4 | 4.4 | 4.9 | 18.1 |
| Dielectric dissipation factor (400 MHz) |  |  | 0.0051 | 0.0052 | 0.0044 | 0.0042 | 0.0052 |
| Flame retardance |  |  | V1 | V0 | V0 | V0 | V0 |

TABLE 1-continued

| Mixing ratio of each component (part by weight) | Kind | particle diameter (nm) | Comparative example | | | |
|---|---|---|---|---|---|---|
| | | | 1 | 2 | 3 | 4 |
| Ethylene propylene rubber | EP35 | — | 100 | 100 | 100 | 100 |
| Ceramic powder | HF120 | — | 450 | 450 | — | — |
| | STNAS | — | — | — | 330 | — |
| Carbon black | SEAST FM | 50 | — | — | — | — |
| | SEAST S | 66 | 50 | — | — | — |
| | SEAST SP | 95 | — | — | — | — |
| | SEAST TA | 122 | — | — | — | — |
| | SEAST SO | 43 | — | 25 | 25 | 25 |
| Powder of Mg(OH)$_2$ | MGZ-1 | — | — | — | 150 | 300 |
| Flame retardant | FCP801 | — | — | — | 50 | 50 |
| Process oil | PW-380 | — | 30 | 30 | 30 | 30 |
| Zinc oxide | META-Z L40 | — | 5 | 5 | 5 | 5 |
| Stearic acid | LUNAC S-30 | — | 1 | 1 | 1 | 1 |
| Age resistor | NONFLEX RD | — | 3 | 3 | 3 | 3 |
| Vulcanization accelerator | Soxinol M | — | 5 | 5 | 5 | 5 |
| Peroxide crosslinking agent | Hi-Cross M | — | 10 | 10 | 10 | 10 |
| Dielectric constant (400 MHz) | | | 12.1 | 12.3 | 11.5 | 6.1 |
| Dielectric dissipation factor (400 MHz) | | | 0.0130 | 0.0150 | 0.0140 | 0.0180 |
| Flame retardance | | | — | — | V0 | V0 |

As shown in table 1, in each example, the dielectric constant was not less than three, and the dielectric dissipation factor was not more than 0.01. Thus the moldings were superior in the dielectric property. On the other hand, the comparative examples 2 through 4 in which the carbon black having an average particle diameter of less than 50 nm (43 nm) was used, the dielectric constants were improved, but the dielectric dissipation factors exceeded 0.01. Thus the moldings were unsuitable for the material of an antenna and the like. In the comparative example 1 in which the carbon black was excessively mixed with the elastomer, the dielectric dissipation factor was high. When the examples 2, 4 through 6 in which 25 parts by weight of the carbon black was mixed with the elastomer, when the particle diameter of the carbon black was 95 nm and 122 nm, the dielectric dissipation factor was not more than 0.004. It is recognized that when the particle diameter of the carbon black is 90 to 130 nm, an excellent dielectric property was shown.

Examples 12 through 18 and Comparative Examples 5 through 8

The ethylene propylene rubber ("EP35" produced by JSR Corporation), magnesium hydroxide ("N-6" or "N-4" produced by Kamishima Chemical Co., Ltd., surface was treated with higher fatty acid), the brominated flame retardant ("FCP801" produced by Suzuhiro Chemical Co., Ltd.), the dielectric ceramic powder ("STNAS" produced by KCM Corporation Co., Ltd.), the carbon black ("SEAST S" produced by Tokai Carbon Co., Ltd.), and the process oil ("PW380" produced by Idemitsu Kosan Co., Ltd.) were mixed with one another at the mixing ratio shown in table 2. In addition, the vulcanization accelerator and a processing aid were added to the mixed components. After the components were kneaded by a press kneader, a molding of each of the examples and the comparative examples having a dimension of 150 mm×150 mm×2.0 mm was obtained by carrying out heated compression molding. The vulcanization condition for each specimen was 170° C.×20 minutes.

The dielectric constant and dielectric dissipation factor of the molding of the dielectric elastomer composition obtained in each of the examples and the comparative examples were measured by the capacitance method and the cavity resonator method. The moldability thereof was evaluated, and the flame retardance test was conducted by carrying out methods described below. The dielectric constant and the dielectric dissipation factor were measured by only the capacitance method in the example 13 and by only the cavity resonator method in the example 18. Table 2 shows the results.

Comparative Examples 9 through 11

By using "N-6" produced by Kamishima Chemical Co., Ltd. processing was performed similarly to the example 12 to evaluate the moldability by methods described below. Table 2 shows the results.

<Measurement of Dielectric Constant and Dielectric Dissipation Factor by Capacitance Method>

A specimen of each obtained molding having a dimension of 20 mm×20 mm×1.5 mm was cut to measure the dielectric constant and dielectric dissipation factor of each of the specimens by the capacitance method in a frequency band of 400 MHz by setting the temperature to 30° C. The measuring apparatus used in the capacitance method was the impedance analyzer: E4991A (produced by Agilent Technologies Inc.). The electrode used was 16453A (produced by Agilent Technologies Inc.).

<Measurement of Dielectric Constant and Dielectric Dissipation Factor by Cavity Resonator Method>

A strip-shaped specimen having a dimension of 1.5 mm×1.5 mm×80 mm was processed from each of the obtained moldings to measure the dielectric constant and dielectric dissipation factor thereof at a frequency band of 1, 3, 5 GHz and 30° C. by using the cavity resonator method (July 1998, magazine of Electronic Monthly, pages from 16 through 19).

<Evaluation of Moldability>

Dielectric elastomer compositions which were sufficiently flowed to the four corners of each molding having a dimension of 150 mm×150 mm×2.0 mm and could be filled to ends thereof were evaluated as having excellent moldability and marked by ○. Dielectric elastomer compositions which were not sufficiently flowed to the four corners of each molding and resulted in insufficient filling were evaluated as having inferior moldability and marked by X.

<Test for Examining Flame Retardance>

Obtained moldings underwent a UL94HB combustion test conforming to ASTM D635 or a UL94B combustion test conforming to ASTM D3801. Regarding the flame retardance of each molding, grades of flame retardance specified in each test method were obtained. Moldings in which flame retardance was not recognized were marked by X to indicate that they were below HB.

TABLE 2

| Mixing ratio of each component | Example | | | | | | |
|---|---|---|---|---|---|---|---|
| (part by weight) | 12 | 13 | 14 | 15 | 16 | 17 | 18 |
| Ethylene propylene rubber | 100 | 100 | 100 | 100 | 100 | 100 | 100 |
| Magnesium hydroxide | | | | | | | |
| N-6[1)] | 300 | 450 | 300 | 250 | 150 | 150 | 400 |
| N-4[2)] | — | — | — | — | — | — | — |
| Surface-treated or not | Treated | Treated | Treated | Treated | Treated | Treated | Treated |
| Brominated flame retardant[3)] | — | — | 50 | 50 | 50 | 50 | — |
| Dielectric ceramic powder[4)] | — | — | — | 50 | 330 | 900 | — |
| Carbon black | 25 | 25 | 25 | 25 | 25 | 25 | 25 |
| Process oil | 30 | 30 | 30 | 30 | 30 | 30 | 30 |
| Other components | 70 | 70 | 70 | 70 | 70 | 70 | 70 |
| Dielectric property (capacitance method, 30° C.) | | | | | | | |
| Dielectric constant 400 MHz | 4.1 | 4.4 | 4.2 | 4.8 | 9.4 | 21.3 | — |
| Dielectric dissipation factor 400 MHz | 0.003 | 0.004 | 0.003 | 0.004 | 0.003 | 0.004 | — |
| Dielectric property (cavity resonator method, 25° C.) | | | | | | | |
| Dielectric constant | | | | | | | |
| 1 GHz | 4.1 | — | 4.2 | 4.8 | 9.4 | 21.8 | 4.3 |
| 3 GHz | 4.2 | — | 4.2 | 4.9 | 9.4 | 22.1 | 4.4 |
| 5 GHz | 4.2 | — | 4.3 | 4.9 | 9.4 | 22.4 | 4.4 |
| Dielectric dissipation factor | | | | | | | |
| 1 GHz | 0.0038 | — | 0.0039 | 0.0040 | 0.0035 | 0.0040 | 0.0039 |
| 3 GHz | 0.0041 | — | 0.0040 | 0.0041 | 0.0037 | 0.0041 | 0.0040 |
| 5 GHz | 0.0041 | — | 0.0041 | 0.0041 | 0.0038 | 0.0042 | 0.0041 |
| Moldability | ○ | ○ | ○ | ○ | ○ | ○ | ○ |
| Flame retardance | HB | V-0 | V-0 | V-0 | V-0 | V-0 | V-0 |

| Mixing ratio of each component | Comparative example | | | | | | |
|---|---|---|---|---|---|---|---|
| (part by weight) | 5 | 6 | 7 | 8 | 9 | 10 | 11 |
| Ethylene propylene rubber | 100 | 100 | 100 | 100 | 100 | 100 | 100 |
| Magnesium hydroxide | | | | | | | |
| N-6[1)] | — | — | — | — | 300 | 700 | 150 |
| N-4[2)] | 100 | 300 | 300 | 150 | — | — | — |
| Surface-treated or not | Treated | Treated | Treated | Treated | Not treated | Treated | Treated |
| Brominated flame retardant[3)] | — | — | 50 | 50 | — | — | — |
| Dielectric ceramic powder[4)] | — | — | — | 330 | — | — | 1200 |
| Carbon black | 25 | 25 | 25 | 25 | 25 | 25 | 25 |
| Process oil | 30 | 30 | 30 | 30 | 30 | 30 | 30 |
| Other components | 70 | 70 | 70 | 70 | 70 | 70 | 70 |
| Dielectric property (capacitance method, 30° C.) | | | | | | | |
| Dielectric constant 400 MHz | 3.8 | 4.3 | 4.4 | 9.4 | — | — | — |
| Dielectric dissipation factor 400 MHz | 0.007 | 0.007 | 0.007 | 0.007 | — | — | — |
| Dielectric property (cavity resonator method, 25° C.) | | | | | | | |
| Dielectric constant | | | | | | | |
| 1 GHz | 3.8 | 4.3 | 4.4 | 9.4 | — | — | — |
| 3 GHz | 3.9 | 4.3 | 4.4 | 9.5 | — | — | — |
| 5 GHz | 3.9 | 4.4 | 4.5 | 9.6 | — | — | — |
| Dielectric dissipation factor | | | | | | | |
| 1 GHz | 0.0067 | 0.0062 | 0.0068 | 0.0068 | — | — | — |
| 3 GHz | 0.0071 | 0.0071 | 0.0071 | 0.0071 | — | — | — |

TABLE 2-continued

| | | | | | | | |
|---|---|---|---|---|---|---|---|
| 5 GHz | 0.0074 | 0.0077 | 0.0078 | 0.0074 | — | — | — |
| Moldability | ○ | ○ | ○ | ○ | X | X | X |
| Flame retardance | X[5] | HB | V-0 | V-0 | — | — | — |

[1] Produced by Kamishima Chemical Co., Ltd.: N-6 ($Fe_2O_3$: 0.001 to 0.003 wt %, CaO: 0.1 to 0.15 wt %, $SiO_2$: 0.03 to 0.05 wt %)
[2] Produced by Kamishima Chemical Co., Ltd.: N-4 ($Fe_2O_3$: 0.07 to 0.1 wt %, CaO: 0.37 to 0.6 wt %, $SiO_2$: 0.43 to 0.6 wt %)
[3] Produced by Suzuhiro Chemical Co., Ltd.: FCP801(Ethylenebispentabromobenzene)
[4] Produced by KCM Corporation Co., Ltd.: STNAS
[5] Not flame-retardance(below HB)

As shown in table 2, the examples 12 through 18 were excellent in the flame retardance thereof and had a low value in the dielectric dissipation factor thereof. A rise of the dielectric dissipation factor caused by an increase (1~5 GHz) in a measured frequency was little recognized. On the other hand, the comparative examples 5 through 8 had a comparatively high dielectric dissipation factor because a large amount of an impurity of the magnesium hydroxide was contained. In addition a rise of the dielectric dissipation factor caused by an increase (1~5 GHz) in a measured frequency was recognized.

In the comparative example 9 in which the magnesium hydroxide not surface-treated was used, moldability was inferior because the affinity of the ethylene propylene rubber for the magnesium hydroxide powder was unfavorable and thus stir resistance at the kneading time was high. In the comparative example 10, because the filling amount of the magnesium hydroxide powder was large, the resistance at the kneading time was high and thus a good molding could not be obtained. In the comparative example 11, because the filling amount of the ceramic powder was large, the resistance at the kneading time was high and thus a good molding could not be obtained.

Examples 19 through 28 and Comparative Examples 12 and 13

The ethylene propylene rubber ("EP35" produced by JSR Corporation), surface-treated magnesium hydroxide powder, a anti-foaming agent ("VESTA-C80EX" produced by Inoue Calcium Corporation), and mixing assistants were mixed with one another at the mixing ratio shown in table 3. In addition, the vulcanization accelerator and the processing aid were added to the mixed components. After the components were kneaded by a press kneader, a molding of each of the examples and the comparative examples having a dimension of 80 mm×80 mm×1.5 mm was obtained by carrying out heated compression molding. The vulcanization condition for each specimen was 170° C.×20 minutes.

The dielectric constant and dielectric dissipation factor of the molding of the dielectric elastomer composition obtained in each of the examples and the comparative examples were measured. The moldability thereof was evaluated, and a flame retardance test was conducted by carrying out methods described below. Table 3 shows the results.

<Measurement of Dielectric Constant and Dielectric Dissipation Factor>

The dielectric constant and dielectric dissipation factor of each of the obtained molding were measured at a frequency band of 400 MHz and 30° C. by the capacitance method. The measuring apparatus used in the capacitance method was the impedance analyzer:E4991A (produced by Agilent Technologies Inc.). The electrode used was 16453A (produced by Agilent Technologies Inc.).

<Observation of Swelling of Molding>

The obtained moldings were visually observed to record whether they swelled.

<Test for Examining Flame retardance>

The obtained moldings underwent the UL94HB combustion test conforming to the ASTM D635 or the UL94V combustion test conforming to the ASTM D3801. Regarding the flame retardance of each molding, grades of flame retardance specified in each test method were obtained.

TABLE 3

| | | | | Example | | | | | |
|---|---|---|---|---|---|---|---|---|---|
| Mixing ratio of each component(part by weight) | | | | 19 | 20 | 21 | 22 | 23 | 24 |
| Ethylene propylene rubber: EP35 | | | Produced by JSR Corporation | 100 | 100 | 100 | 100 | 100 | 100 |
| Powder of $Mg(OH)_2$ | Content of $Fe_2O_3$ | Surface-treating agent | | | | | | | |
| Kisuma5B | Less than 0.001 wt % | Unsaturated fatty acid | Produced by Showa Chemical Co., Ltd. | 300 | 150 | 150 | 150 | — | — |
| MGZ-1 | Less than 0.01 wt % | Unsaturated fatty acid | Produced by Sakai Chemical Industry Co., Ltd. | — | — | — | — | 300 | 150 |
| N-4 | 0.07 to 0.1 wt % | Saturated fatty acid | Produced by Kamishima Chemical Co., Ltd. | — | — | — | — | — | — |
| N-6 | 0.001 to 0.003 wt % | Saturated fatty acid | Produced by Kamishima Chemical Co., Ltd. | — | — | — | — | — | — |
| Anti-foaming agent: VESTA-C80EX | | | Produced by Inoue Calcium Corporation | — | — | — | — | — | — |
| Ceramic powder: STNAS | | | Produced by KCM Corporation Co., Ltd. | — | 50 | 330 | 1000 | — | 330 |

TABLE 3-continued

| | | | | | | | |
|---|---|---|---|---|---|---|---|
| Flame retardant: FCP801 | Produced by Suzuhiro Chemical Co., Ltd. | — | — | — | — | 50 | 50 |
| Carbon black: SEAST S | Produced by Tokai Carbon Co., Ltd. | 25 | 25 | 25 | 25 | 25 | 25 |
| Process oil: PW-380 | Produced by Idemitsu Kosan Co., Ltd. | 30 | 30 | 30 | 30 | 30 | 30 |
| Zinc oxide: META-Z L40 | Produced by Inoue Calcium Corporation | 5 | 5 | 5 | 5 | 5 | 5 |
| Stearic acid: LUNAC S-30 | produced by Kao Corporation | 1 | 1 | 1 | 1 | 1 | 1 |
| Age resistor: NONFLEX RD | produced by Seiko Chemical Co., Ltd. | 3 | 3 | 3 | 3 | 3 | 3 |
| Vulcanization accelerator: Soxinol M | produced by Sumitomo Chemical Co., Ltd. | 5 | 5 | 5 | 5 | 5 | 5 |
| Perioxide crosslinking agent: Hi-Corss M | produced by Seiko Chemical Co., Ltd. | 10 | 10 | 10 | 10 | 10 | 10 |
| Molding swelled or not | | Did not swell | Did not swell | Did not swell | Did not swell | Did not swell | Did not swell |
| Dielectric constant (400 MHz) | | 4.1 | 4.8 | 9.2 | 21 | 4.2 | 9.3 |
| Dielectric dissipation factor (400 MHz) | | 0.0050 | 0.0044 | 0.0046 | 0.0043 | 0.0045 | 0.0040 |
| Flame retardance | | HB | HB | HB | HB | V-0 | V-0 |

| | | | | Example | | | | Comparative example | |
|---|---|---|---|---|---|---|---|---|---|
| Mixing ratio of each component (part by weight) | | | | 25 | 26 | 27 | 28 | 12 | 13 |
| Ethylene propylene rubber: EP35 | | | Produced by JSR Corporation | 100 | 100 | 100 | 100 | 100 | 100 |
| Powder of Mg(OH)$_2$ | Content of Fe$_2$O$_3$ | Surface-treating agent | | | | | | | |
| Kisuma5B | Less than 0.001 wt % | Unsaturated fatty acid | Produced by Showa Chemical Co., Ltd. | — | — | — | — | — | — |
| MGZ-1 | Less than 0.01 wt % | Unsaturated fatty acid | Produced by Sakai Chemical Industry Co., Ltd. | — | — | — | — | — | — |
| N-4 | 0.07 to 0.1 wt % | Saturated fatty acid | Produced by Kamishima Chemical Co., Ltd. | — | — | — | — | 300 | 300 |
| N-6 | 0.001 to 0.003 wt % | Saturated fatty acid | Produced by Kamishima Chemical Co., Ltd. | 150 | 300 | 150 | 300 | — | — |
| Anti-foaming agent: VESTA-C80EX | | | Produced by Inoue Calcium Corporation | 5 | 5 | — | — | — | 5 |
| Ceramic powder: STNAS | | | Produced by KCM Corporation Co., Ltd. | 330 | — | 330 | — | — | — |
| Flame retardant: FCP801 | | | Produced by Suzuhiro Chemical Co., Ltd. | 50 | 50 | — | 50 | 50 | — |
| Carbon black: SEAST S | | | Produced by Tokai Carbon Co., Ltd. | 25 | 25 | 25 | 25 | 25 | 25 |
| Process oil: PW-380 | | | Produced by Idemitsu Kosan Co., Ltd. | 30 | 30 | 30 | 30 | 30 | 30 |
| Zinc oxide: META-Z L40 | | | Produced by Inoue Calcium Corporation | 5 | 5 | 5 | 5 | 5 | 5 |
| Stearic acid: LUNAC S-30 | | | produced by Kao Corporation | 1 | 1 | 1 | 1 | 1 | 1 |
| Age resistor: NONFLEX RD | | | produced by Seiko Chemical Co., Ltd. | 3 | 3 | 3 | 3 | 3 | 3 |
| Vulcanization accelerator: Soxinol M | | | produced by Sumitomo Chemical Co., Ltd. | 5 | 5 | 5 | 5 | 5 | 5 |
| Perioxide crosslinking agent: Hi-Corss M | | | produced by Seiko Chemical Co., Ltd. | 10 | 10 | 10 | 10 | 10 | 10 |
| Molding swelled or not | | | | Did not swell | Did not swell | Swelled | Swelled | Swelled | Did not swell |
| Dielectric constant (400 MHz) | | | | 9.4 | 4.2 | 9.2 | 4.2 | 4.1 | 4.2 |
| Dielectric dissipation factor (400 MHz) | | | | 0.0040 | 0.0045 | 0.0070 | 0.0030 | 0.0073 | 0.0070 |
| Flame retardance | | | | V-0 | V-0 | HB | V-0 | V-0 | HB |

As shown in table 3, in the examples 19 through 24 in which the predetermined magnesium hydroxide powder surface-treated with the unsaturated fatty acid and in the examples 25 and 26 in which the predetermined magnesium hydroxide powder surface-treated with the saturated fatty acid and the anti-foaming agent were used in combination, the moldings did not swell and the dielectric property was excellent (dielectric constant: not less than three, dielectric dissipation factor: not more than 0.006).

On the other hand, in the examples 27, 28 and the comparative example 12 in which the predetermined magnesium hydroxide powder surface-treated with the saturated fatty acid was used and the anti-foaming agent was not used, the moldings swelled. In the comparative examples 12 and 13 in which the magnesium hydroxide powder which contained 0.07 wt % of $Fe_2O_3$ was used, the dielectric dissipation factor exceeded 0.006.

INDUSTRIAL APPLICABILITY

Excellent flame retardance can be imparted to the dielectric elastomer composition of the present invention as necessary in consideration of an influence on environment. In addition because the dielectric elastomer composition has a low dielectric dissipation factor, it can be preferably utilized as the high-frequency electronic component material.

The invention claimed is:

1. A dielectric elastomer composition comprising an elastomer and, (A) carbon black and (B) at least one powder selected from among magnesium hydroxide powder and dielectric ceramic powder in admixture with said elastomer,
    wherein an average particle diameter of said carbon black is 50 to 200 nm, and 5 to 25 parts by weight thereof is in admixture with 100 parts by weight of said elastomer;
    in said magnesium hydroxide powder, a content of ferric oxide is not more than 0.02 wt % and
    in at least one measuring condition selected from among measuring condition (1) in which a frequency is 400 MHz and a temperature is 30° C. and measuring condition (2) in which a frequency is 5 GHz and a temperature is 25° C., a dielectric constant of said dielectric elastomer composition is not less than 3, and a dielectric dissipation factor thereof is not more than 0.006.

2. A dielectric elastomer composition comprising an elastomer, and, (A) carbon black and (B) at least one powder selected from among magnesium hydroxide powder and dielectric ceramic powder in admixture with said elastomer,
    wherein an average particle diameter of said carbon black is 50 to 200 nm, and 5 to 40 parts by weight thereof is in admixture with 100 parts by weight of said elastomer;
    150 to 450 parts by weight of said magnesium hydroxide powder is in admixture with 100 partrs by weight of said elastomer;
    in said magnesium hydroxide powder, a content of ferric oxide is not more than 0.02 wt %; and
    in at least one measuring condition selected from among measuring condition (1) in which a frequency is 400 MHz and a temperature is 30° C. and measuring condition (2) in which a frequency is 5 GHz and a temperature is 25° C., a dielectric constant of said dielectric elastomer composition is not less than 3, and a dielectric dissipation factor thereof is not more than 0.01.

3. The dielectric elastomer composition according to claim 1 or 2, wherein in said magnesium hydroxide powder, a content of calcium oxide is not more than 0.2 wt %.

4. The dielectric elastomer composition according to claim 1 or 2, wherein in said magnesium hydroxide powder, a content of silicon dioxide is not more than 0.2 wt %.

5. The dielectric elastomer composition according to claim 1 or 2, wherein an average particle diameter of said magnesium hydroxide powder is not more than 10 μm.

6. The dielectric elastomer composition according to claim 1 or 2, wherein said magnesium hydroxide powder is surface-treated.

7. The dielectric elastomer composition according to claim 6, wherein unsaturated fatty acid or saturated fatty acid is used to surface-treat said magnesium hydroxide powder; and in mixing said magnesium hydroxide powder surface-treated with said saturated fatty acid with said elastomer, a anti-foaming agent is mixed with said elastomer.

8. The dielectric elastomer composition according to claim 7, wherein said unsaturated fatty acid is oleic acid.

9. The dielectric elastomer composition according to claim 7, wherein said saturated fatty acid is stearic acid.

10. The dielectric elastomer composition according to claim 1 or 2, wherein a brominated flame retardant except polybromodiphenyl ether and polybromobiphenyl is mixed with said elastomer.

11. The dielectric elastomer composition according to claim 1 or 2, wherein said elastomer is at least one elastomer selected from among a styrene elastomer and an olefin elastomer.

12. The dielectric elastomer composition according to claim 1 or 2, wherein said elastomer is ethylene propylene rubber.

13. A high-frequency electronic component material, for handling electric signals whose frequencies are not less than 100 MHz, which is formed by using a molding of a dielectric elastomer composition according to claim 1 or 2.

14. The high-frequency electronic component material according to claim 13, which can be obtained by sticking an electrode to a surface of a molding of said dielectric elastomer composition or performing insert-molding said electrode into said molding.

* * * * *